US011913179B2

(12) United States Patent
Aziz et al.

(10) Patent No.: US 11,913,179 B2
(45) Date of Patent: Feb. 27, 2024

(54) MATS AND CONNECTOR SYSTEMS THEREOF

(71) Applicant: Newpark Mats & Integrated Services LLC, The Woodlands, TX (US)

(72) Inventors: Saad Aziz, Carencro, LA (US); Gaurav Agrawal, Katy, TX (US)

(73) Assignee: NEWPARK MATS & INTEGRATED SERVICES LLC, The Woodlands, TX (US)

( * ) Notice: Subject to any disclaimer, the term of this patent is extended or adjusted under 35 U.S.C. 154(b) by 542 days.

(21) Appl. No.: 17/062,777

(22) Filed: Oct. 5, 2020

(65) Prior Publication Data

US 2022/0106742 A1 Apr. 7, 2022

(51) Int. Cl.
*E01C 9/08* (2006.01)
*E01C 5/00* (2006.01)
*H01B 5/00* (2006.01)

(52) U.S. Cl.
CPC .............. *E01C 9/086* (2013.01); *E01C 5/005* (2013.01); *E01C 2201/16* (2013.01); *H01B 5/002* (2013.01)

(58) Field of Classification Search
None
See application file for complete search history.

(56) References Cited

U.S. PATENT DOCUMENTS 1,602,115 A * 10/1926 Malis ..................... A47C 17/66 5/187
1,982,515 A * 11/1934 Hodes ................ B29D 99/0057 428/158
2,070,839 A * 2/1937 Place ...................... B60R 3/002 52/177
2,373,047 A * 4/1945 Pabst .................. A47C 27/001 5/690
3,262,134 A * 7/1966 Bramble, Jr. ............ A63B 6/00 5/420

(Continued)

FOREIGN PATENT DOCUMENTS

RU 185392 U1 12/2018
WO 2016128741 A1 8/2016
WO 2017070311 A1 4/2017

OTHER PUBLICATIONS

Toggler Anchors, "Snaptoggle Toggle Bolts", video date May 21, 2009, site visited Oct. 5, 2020, https://www.youtube.com/watch?v=SC1ZuxuZ2PU.

(Continued)

*Primary Examiner* — Thomas B Will
*Assistant Examiner* — Katherine J Chu
(74) *Attorney, Agent, or Firm* — CANTOR COLBURN LLP

(57) ABSTRACT

Apparatus and methods related to mats and connects are described. The apparatus include a mat having a top side, a bottom side, and an interior defined between the top side and the bottom side, and at least one connector post extending within the interior of the mat, wherein the at least one connector post comprises a connector pin cavity extending within the interior of the mat and configured to receive a connector pin and at least one locking structure configured to engage with a portion of the connector pin and secure the connector pin to the at least one connector post.

19 Claims, 11 Drawing Sheets

(56) References Cited

U.S. PATENT DOCUMENTS

| | | | | | |
|---|---|---|---|---|---|
| 4,362,426 | A * | 12/1982 | Ruckstuhl | E01C 9/086 | 403/182 |
| 6,511,257 | B1 * | 1/2003 | Seaux | E01C 9/086 | |
| 6,722,831 | B2 * | 4/2004 | Rogers | F16B 21/02 | 411/553 |
| 8,936,374 | B1 * | 1/2015 | Royse | E01C 9/086 | 404/35 |
| 9,337,586 | B2 * | 5/2016 | McDowell | H01R 43/26 | |
| 9,506,255 | B1 * | 11/2016 | Jones | E01C 9/086 | |
| 9,885,156 | B2 * | 2/2018 | Malmquist | E01C 9/086 | |
| 11,378,118 | B2 * | 7/2022 | Marcel | B29C 66/1122 | |
| 2004/0005430 | A1 * | 1/2004 | Rogers | E01C 5/005 | 428/44 |
| 2015/0099377 | A1 * | 4/2015 | McDowell | B32B 33/00 | 439/100 |
| 2018/0029305 | A1 * | 2/2018 | Hugghins | B05C 11/1015 | |
| 2018/0030667 | A1 * | 2/2018 | Penland, Jr. | B32B 3/06 | |
| 2018/0274183 | A1 * | 9/2018 | Wright | E01C 9/086 | |
| 2021/0088061 | A1 * | 3/2021 | Jones | F16B 5/0621 | |
| 2022/0106742 | A1 * | 4/2022 | Aziz | E01C 5/223 | |

OTHER PUBLICATIONS

International Search Report, International Application No. PCT/US2021/052770, dated Dec. 9, 2021, Russian Federal Institute of Industrial Property; International Search Report 3 pages.

International Written Opinion, International Application No. PCT/US2021/052770, dated Dec. 9, 2021, Russian Federal Institute of Industrial Property; International Written Opinion 4 pages.

* cited by examiner

MATS AND CONNECTOR SYSTEMS THEREOF

BACKGROUND

When performing operations with heavy equipment it may be useful to provide a firm, stable, and continuous support surface to support such heavy equipment or otherwise provide for a stable work surface and/or a support surface over which vehicles may be conveyed. Such support surfaces can provide support for the equipment, vehicles, and personnel involved in work processes and may be configured to withstand severe weather and other harsh environmental impacts. The components of the support surface may be capable of being quickly and easily installed and capable of being easily removed and reused.

A variety of mat systems have been developed for the construction of temporary roadways and support surfaces. These mat systems typically utilize prefabricated, multi-layered mats which can be installed in a variety of configurations to create roadways or other support surfaces. These mats, which are constructed of a number of individual boards or planks affixed together in a variety of configurations, generally interconnect or inter mesh with one another to form a continuous, or nearly continuous, support surface. It may be advantageous to have improved mats and systems for providing and creating temporary roadways and/or support surfaces.

The mat systems may include overlay or added surfaces or structures to provide additional features or characteristics to the formed temporary roadways and support surfaces. In some such configurations, a skin or similar type layer may be fixedly attached to a surface of the mat system. The skin layers can be used to provide electrical grounding, improved grip surfaces, etc., as will be appreciated by those of skill in the art. The skin layers are typically attached using a pin-type connection. Improved connector systems for attaching skin layers to mats may be desirable.

SUMMARY

According to some embodiments, mats are provided and described. An apparatus of an embodiment includes a mat having a top side, a bottom side, and an interior defined between the top side and the bottom side and at least one connector post extending within the interior of the mat, wherein the at least one connector post comprises a connector pin cavity extending within the interior of the mat and configured to receive a connector pin and at least one locking structure configured to engage with a portion of the connector pin and secure the connector pin to the at least one connector post.

In addition to one or more of the features described above, or as an alternative, embodiments of the apparatuses may include that the connector pin cavity comprises a slot extending through the interior of the mat.

In addition to one or more of the features described above, or as an alternative, embodiments of the apparatuses may include that the locking structure of the at least one connector post comprises two pockets arranged at opposite sides of the slot within the interior of the mat.

In addition to one or more of the features described above, or as an alternative, embodiments of the apparatuses may include that a first connector post of the at least one connector post and a second connector post of the at least one connector post are aligned within the interior of the mat.

In addition to one or more of the features described above, or as an alternative, embodiments of the apparatuses may include that the first connector post and the second connector post are welded together.

In addition to one or more of the features described above, or as an alternative, embodiments of the apparatuses may include that the top side has a top surface that is configured to be cut to expose the connector pin cavity.

In addition to one or more of the features described above, or as an alternative, embodiments of the apparatuses may include a skin layer configured to be attached to the mat by a connector pin installed into the connector pin cavity.

In addition to one or more of the features described above, or as an alternative, embodiments of the apparatuses may include that the skin layer is an electrically conductive cover or cage.

In addition to one or more of the features described above, or as an alternative, embodiments of the apparatuses may include that the skin layer is a high traction skin.

In addition to one or more of the features described above, or as an alternative, embodiments of the apparatuses may include that the skin layer is a timber panel.

In addition to one or more of the features described above, or as an alternative, embodiments of the apparatuses may include a connector pin installed into the connector pin cavity.

In addition to one or more of the features described above, or as an alternative, embodiments of the apparatuses may include that the connector pin comprises a pin foot configured to engage with the at least one locking structure.

In addition to one or more of the features described above, or as an alternative, embodiments of the apparatuses may include that the connector pin is rotatable within the connector pin cavity to move the pin foot from an engaged and locked position with the at least one locking structure to a disengaged and unlocked position from the at least one locking structure.

In addition to one or more of the features described above, or as an alternative, embodiments of the apparatuses may include that the connector post is integrally molded within the mat.

In addition to one or more of the features described above, or as an alternative, embodiments of the apparatuses may include that the mat includes a surface marker configured to identify a location of the connector post.

According to some embodiments, methods are provided. The methods include providing a mat with at least one connector pin cavity defined within a respective connector post of the mat, wherein the at least one connector post extends within an interior of the mat and is configured to receive a connector pin with at least one locking structure configured to engage with a portion of the connector pin and secure the connector pin to the at least one connector post, positioning a skin layer on the mat, and installing a connector pin within the connector pin cavity to secure the skin layer to the mat.

In addition to one or more of the features described above, or as an alternative, embodiments of the methods may include that installing the connector pin comprises turning the connector pin a quarter turn to secure the portion of the connector pin to the mat with the at least one locking structure of the respective connector post.

In addition to one or more of the features described above, or as an alternative, embodiments of the methods may include securing the skin layer to the mat with a plurality of additional connector pins at a plurality of respective connector posts of the mat.

In addition to one or more of the features described above, or as an alternative, embodiments of the methods may include cutting a surface of the mat to expose the at least one connector pin cavity.

In addition to one or more of the features described above, or as an alternative, embodiments of the methods may include that the cutting is performed at a surface marker on the mat.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure, are apparent from the following detailed description taken in conjunction with the accompanying drawings in which like elements may be numbered alike and:

DETAILED DESCRIPTION

Characteristics and advantages of the present disclosure and additional features and benefits will be readily apparent to those skilled in the art upon consideration of the following detailed description and accompanying figures. It should be understood that the description herein and associated drawings, being of example embodiments, are not intended to limit the claims of this patent or any patent or patent application claiming priority hereto. On the contrary, the intention is to cover all modifications, equivalents, and/or alternatives as appreciated by those of skill in the art. Many changes may be made to the particular embodiments and details disclosed herein without departing from the scope of the present disclosure.

Figure 1A:
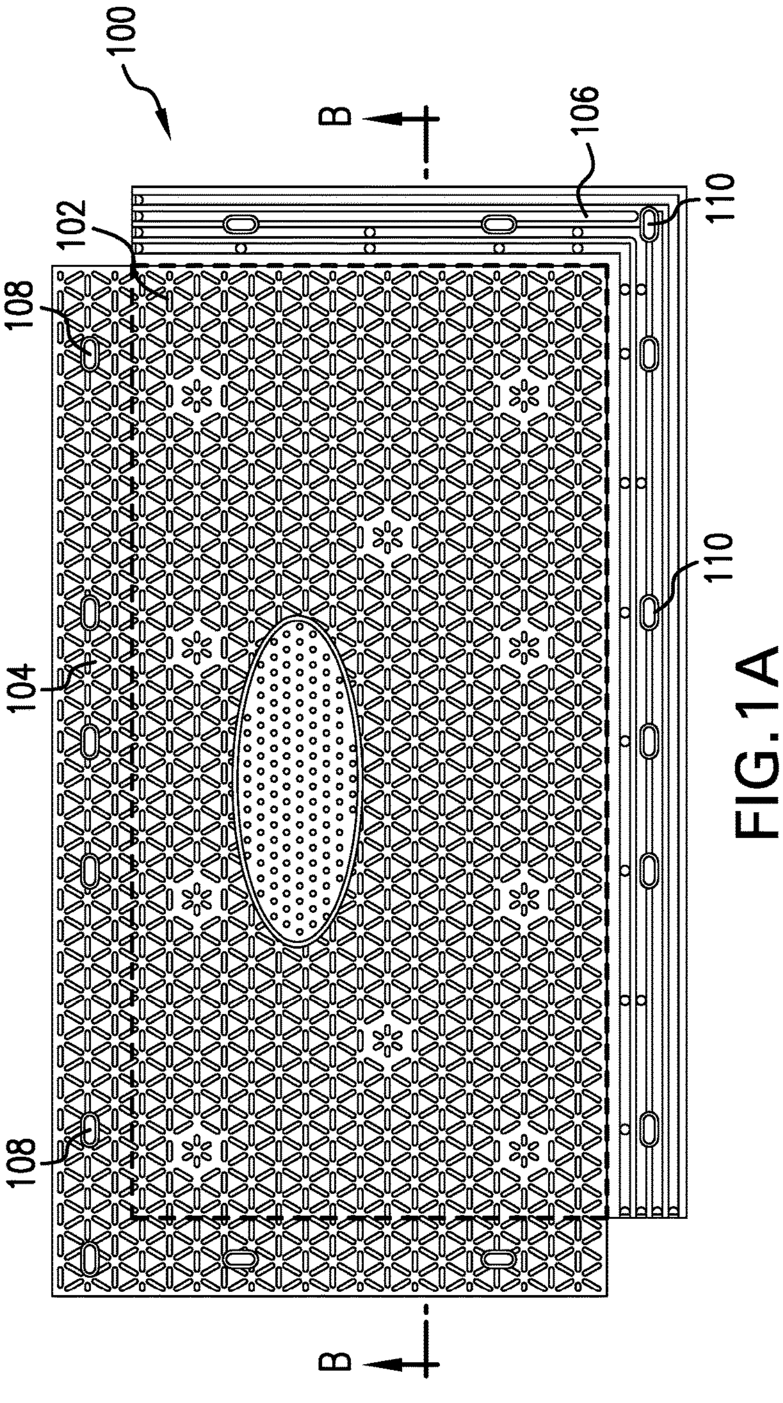
FIG. 1A is a schematic illustration of a mat that may incorporate embodiments of the present disclosure.
Figure 1B:
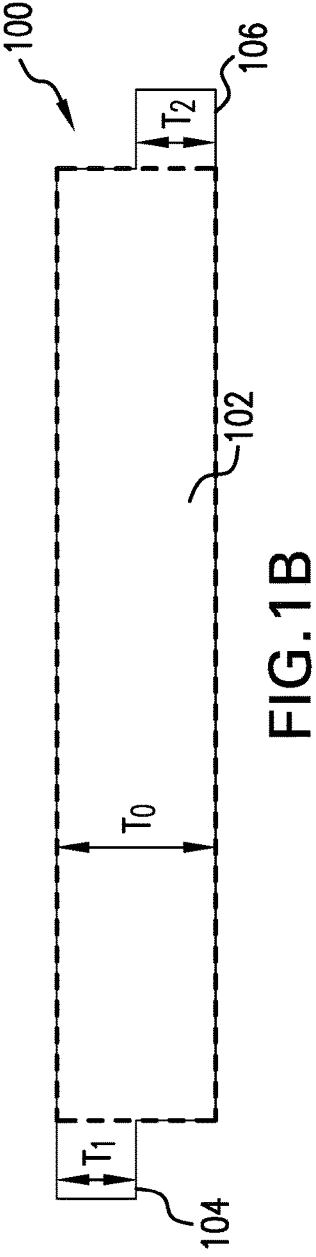
FIG. 1B is a cross-sectional illustration of the mat of FIG. 1A as viewed along the line B-B of FIG. 1A.

Referring to FIGS. 1A-1B, schematic illustrations of a mat 100 that may incorporate embodiments of the present disclosure are shown. The mat 100 is configured to be a stand-alone structure or may be joined with one or more additional similar mats to define a support surface of a desired shape and/or size. The mat 100 is configured to provide a work or support surface over which vehicles may traverse, equipment may be installed and operated, etc. FIG. 1A illustrates a top-down plan view illustration of the mat 100 and FIG. 1B is a cross-sectional illustration of the mat 100 as viewed along the line B-B in FIG. 1A. The mat 100 includes a main body 102, a first lip structure 104, and a second lip structure 106. As shown, the main body 102 has a main body thickness $T_0$, and each lip structure 104, 106 has a respective lip structure thickness $T_1$, $T_2$. Because the mat 100 is configured to be joinable with other similar mats, the lip structure thicknesses $T_1$, $T_2$ can each be, for example, equal to half the main body thickness $T_0$. In some configurations, the lip structure thicknesses $T_1$, $T_2$ can each be, for example, substantially equal to the main body thickness $T_0$.

The lip structures 104, 106 each extend outward from the main body 102. In one or more embodiments, each of the lip structures 104, 106 may extend from about half of a perimeter of the main body 102. The lip structures 104, 106 each include, as shown, respective pin apertures 108, 110 that are configured to receive a locking pin (not shown) to join two mats that are arranged adjacent to each other with pin apertures aligned. Such locking pins can be used to ensure a secure and continuous surface defined by the joined mats. That is, when two mats similar to that shown in FIGS. 1A-1B are joined by one or more locking pins installed through aligned pin apertures 108, 110, a first lip structure 104 on one mat 100 may overlap a second lip structure 106 of the adjacent mat, with the joined first and second lip structures of the two mats having a thickness equal to the main body thickness $T_0$.

Although shown and described as distinct components or features, the main body 102, the first lip structure 104, and the second lip structure 106 may be formed of a single continuous material (e.g., a uniform body), from two panels or portions joined together, or from three or more joined panels of portions. As a non-limiting example, the lip structures 104, 106 can be separately attached to, bonded to, or otherwise secured to the main body 102. As another example, the main body 102 can be formed from two panels, each having one of the lip structures 104, 106, and the two panels can be attached, bonded, or otherwise secured together. Accordingly, the illustrative configuration shown and described with respect to FIGS. 1A-1B is not intended to be limiting, but rather is provided for illustrative and explanatory purposes only.

Figure 2:
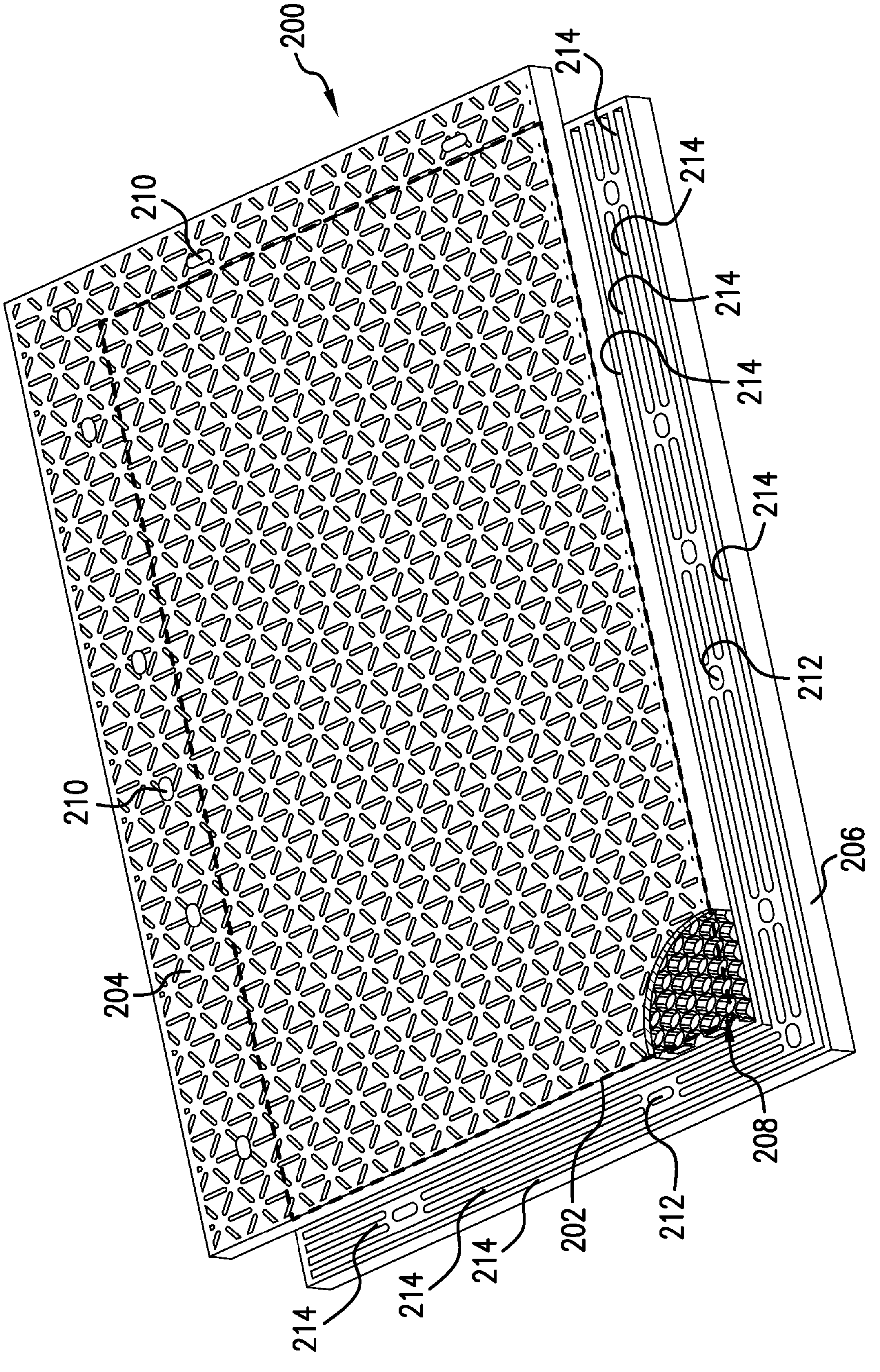
FIG. 2 an isometric illustration of a mat that may incorporate embodiments of the present disclosure, with a partial cutaway illustrating an interior structure of the mat.

Turning now to FIG. 2, a schematic illustration of a mat 200 that may incorporate embodiments of the present disclosure is shown. The mat 200 may have a similar construction as that shown and described with respect to the mat 100 in FIGS. 1A-1B. For example, the mat 200 may be made from a rigid material capable of withstanding compression forces, such as weights or other loads, positioned on the mat 200. For example, the mat 200 may be constructed of a thermoplastic polymeric material, such as polyethylene or alkathene. In one or more embodiments, the mat 200 can be made of high-density polyethylene, medium-density polyethylene, low-density polyethylene, or mixtures thereof.

The mat 200 includes a main body 202, a first lip structure 204, and a second lip structure 206, with the first and second lip structures 204, 206 extending from the main body 202 as illustrated above. As described above, the first and second lip structures 204, 206 extend or cantilever from portions of the exterior surfaces of the main body 202. The lip structures 204, 206 each include respective pin apertures 210, 212 to enable connection to and joining of two adjacent mats. The lip structures 204, 206 may also include respective rib structures 214 (only shown for the second lip structure 206 in this illustration) which may be aligned (e.g., top to bottom) or misaligned with a similar ribbed structure of an adjacent mat when two mats are arranged adjacent to each other and connected by locking pins.

The main body 202 includes an interior support structure 208. The interior support structure 208 is configured to provide strength to the mat 200, such as crush strength. The interior support structure 208 may be a combination of voids and ribs that are encapsulated by exterior surfaces of the main body 202. Thus, the interior support structure 208 can permit a reduction in weight as compared to a solid body structured mat.

The interior support structure 208 of the main body 202, may be, in some configurations, an interconnected web structure such as in a honeycomb or other geometric pattern, which may be a repeating pattern of the same geometric shape. As noted, the interior support structure 208 defines voids within the main body 202.

For example, in one non-limiting example, the voids of the interior support structure 208 may define at least 30% of the interior volume of the main body 202 (i.e., the main body 202 is 30% internally hollow in this example). The size and shape of the repeating pattern of the interconnected web structure can be changed or modified to change the number of voids in the main body 202. For example, the voids may define at least 45%, at least 50%, at least 60%, at least 70%, and/or other amount of the interior volume of the mat 200 that will be appreciated by those having ordinary skill in the art, depending on the application and use of the mat 200. In configurations where the interior support structure 208 is a geometric repeating pattern, each void of the interior support structure 208 may be between and inclusive of about 2.5 inches (6.35-cm) and about 5 inches (12.7-cm) in the largest dimension thereof.

Figure 3:
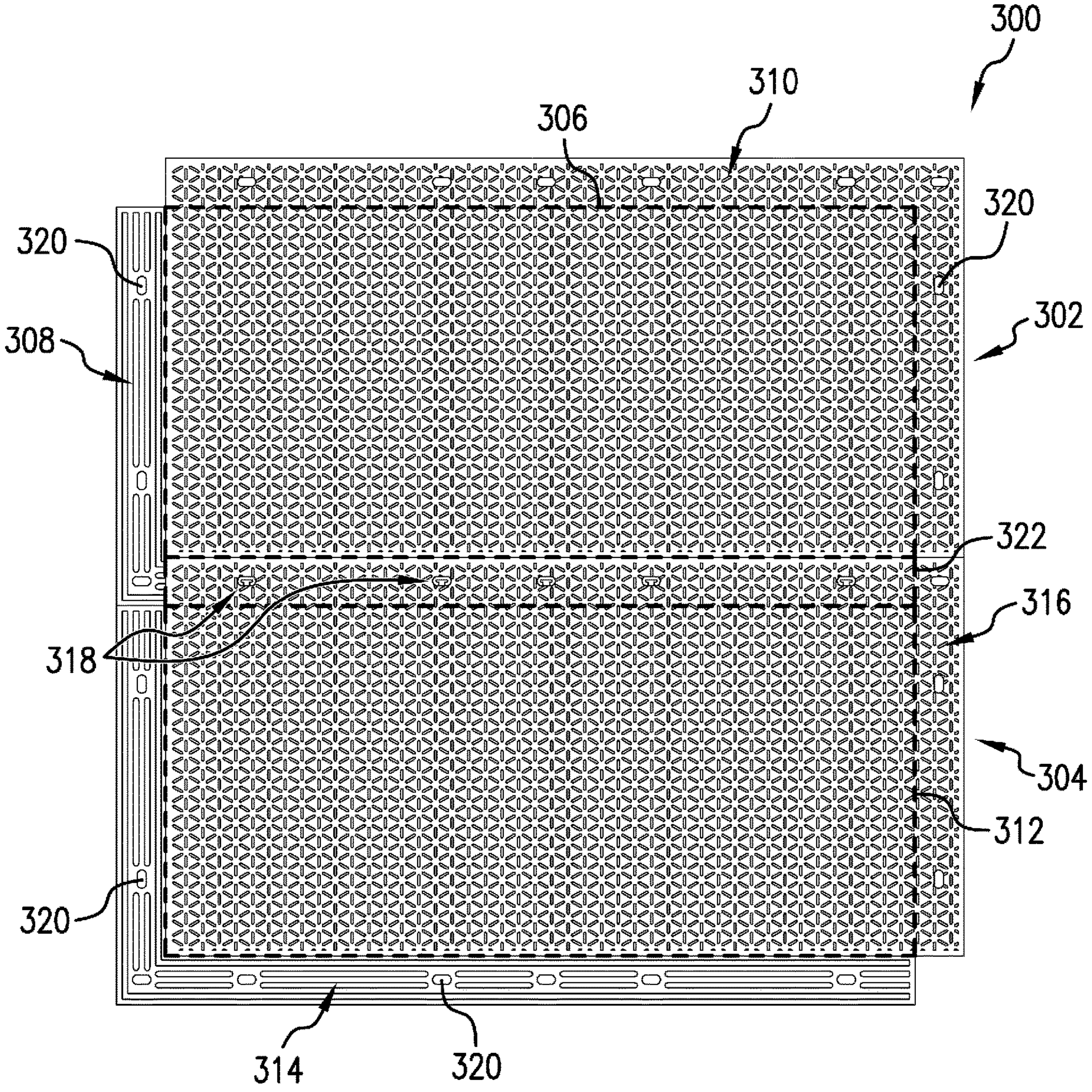
FIG. 3 is a schematic illustration of a mat assembly of two joined mats that may incorporate embodiments of the present disclosure.

Turning now to FIG. 3, a schematic illustration of a mat assembly 300 that can incorporate embodiments of the present disclosure is shown. The mat assembly 300 includes, in this illustration, two joined mats 302, 304. The mat assembly 300 is a modular mat system which incorporates the mats as shown and described above. A first mat 302 of the mat assembly 300 has a respective main body 306 with lip structures 308, 310 extending therefrom. A second mat 304 of the mat assembly 300 has a respective main body 312 with lip structures 314, 316 extending therefrom. The two mats 302, 304 are joined at overlapping lip structures 308, 316. Locking pins 318 are inserted through aligned pin apertures 320 of the two overlapping lip structures 308, 316. As such, a joined and overlapping portion 322 is defined by a portion of the first mat 302 and a portion of the second mat 304. The overlapping portion 322 has the same total thickness as each of the main body 306 of the first mat 302 and the main body 312 of the second mat 304. Each of the main bodies 306, 312 may have an interior support structure that includes voids and ribs that define the voids, in order to provide strength and rigidity while enabling a relatively light-weight total structure.

FIG. 3 is illustrative of the modular nature of the mats of the present disclosure. Multiple mats may be arranged together to define a continuous and connected support surface. Such support surface may be used to provide a firm and secure surface or ground upon which vehicles may be conveyed, equipment employed, etc. Although FIG. 3 illustrates only two mats arranged adjacent to each other, those of skill in the art will appreciate that any number of interlocking and arranged mats may be provided to form a desired support surface having a geometry based on the arrangement of the mats.

FIG. 3 illustrates the locking pins 318 installed through the pin apertures 320 to attach the two mats 302, 304. The pin apertures 320 are located within portions of the lip structures 308, 310. The mats 302, 304 may also include mounting apertures, as described below, that enable additional pins or other securing elements to attach a skin, structure, or other layer to the top surface of the mat(s) 302, 304. These mounting apertures may be defined and formed within the internal structure of the main bodies 306, 312.

Figure 4:
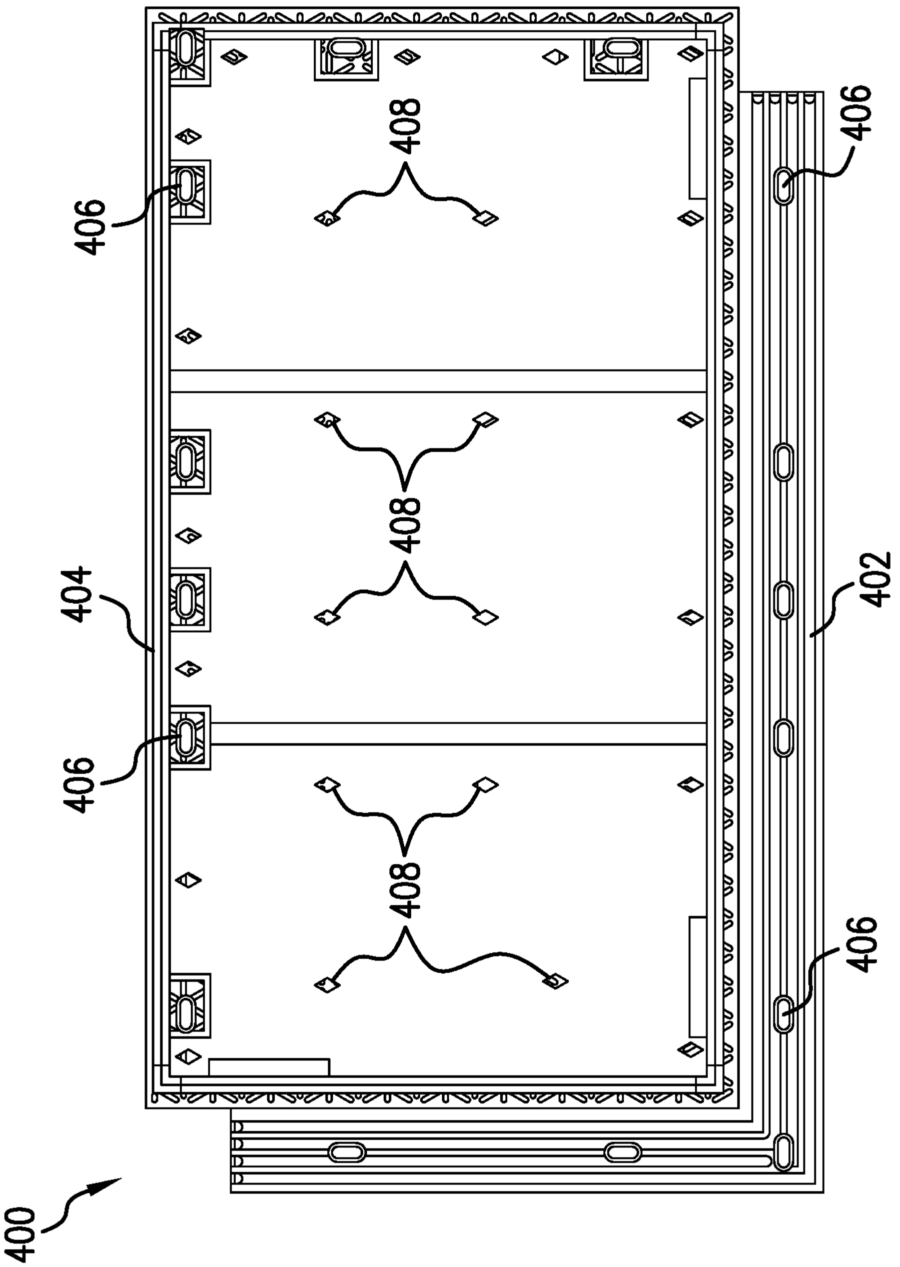
FIG. 4 is a schematic illustration of a mat in accordance with an embodiment of the present disclosure.

Turning now to FIG. 4, a schematic illustration of a mat 400 that can incorporate embodiments of the present disclosure is shown. The mat 400 may be part of a modular mat system that can incorporate mats as shown and described above. The mat 400 may be joined and attached together with other similar mats along lip structures 402, 404, as described above. To join with another mat, the mat 400 includes pin apertures 406 for receiving locking pins through two overlapping lip structures. The mat 400 includes a main body that may have an interior support structure that includes voids and ribs that define the voids, in order to provide strength and rigidity while enabling a relatively light-weight total structure.

The interior support structure can include intersections between ribs, which may be referred to herein as a corner post. The corner post may be a structure where two or more internal ribs of the interior support structure intersect. The corner post may be a cylindrical structure that can have a connector pin cavity passing therethrough. At the ends of the connector pin cavity the mat 400 may be manufactured or originally sealed with a surface skin/material. The surface skin/material may be cut or removed to allow access to the connector pin cavity and insertion of a connector pin or the like. As shown in FIG. 4, the mat 400 includes multiple connector locations 408 that are located at respective corner posts. The connector locations 408 are defined by connector posts within the interior support structure which may be formed for the purpose of receiving a connector pin or the like. In some embodiments, the connector locations 408 may be identified by a surface marking (e.g., the diamond shapes illustrated in FIG. 4). The surface marking may be a color marker, a texture marker, or the like, that identifies the location of a connector post. That is, the surface marking may be used to identify where a cut or other material removal should be performed to expose a connector post in accordance with the present disclosure.

Figure 5A:
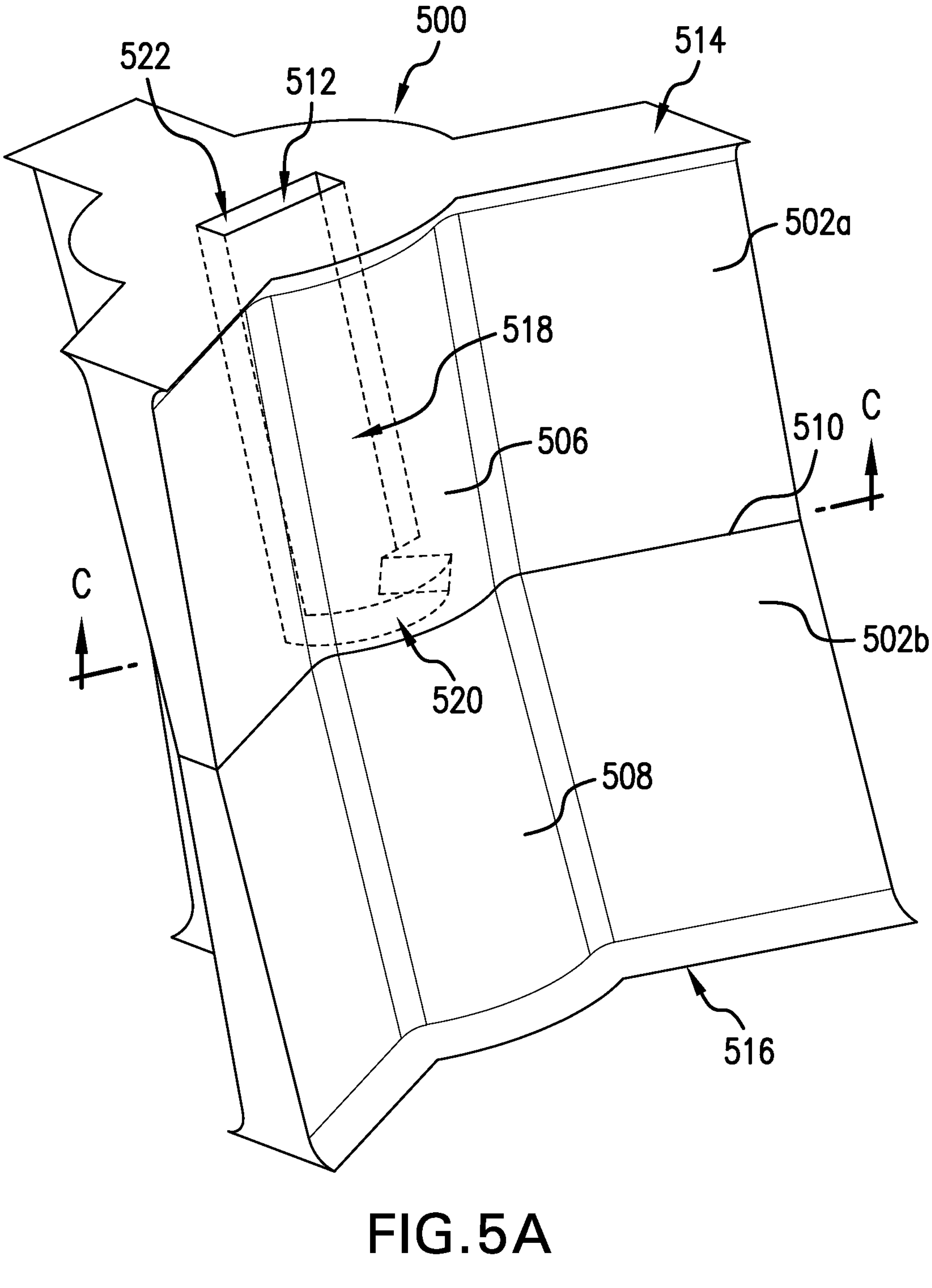
FIG. 5A is a skewed view illustration of a connector post in accordance with an embodiment of the present disclosure.
Figure 5B:
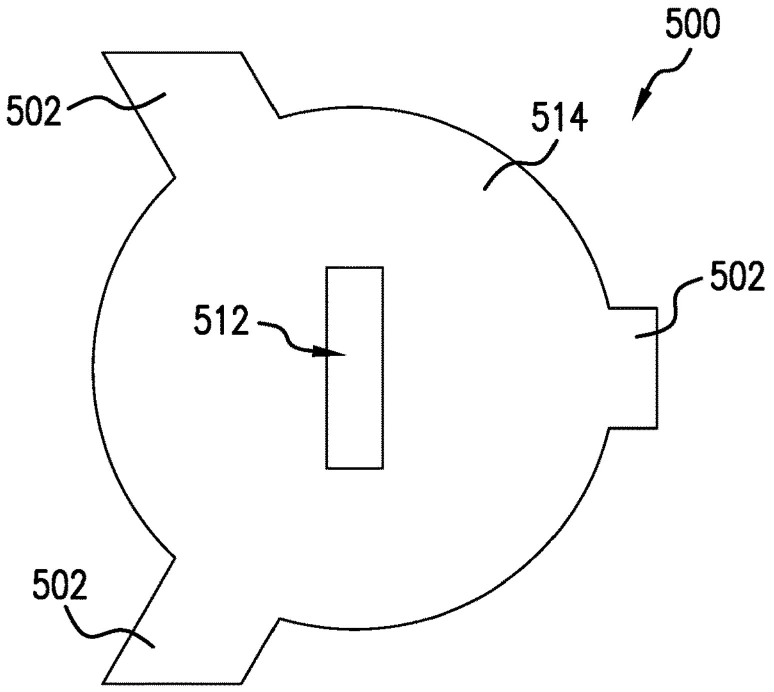
FIG. 5B is a top down illustration of the connector post of FIG. 5A.
Figure 5C:
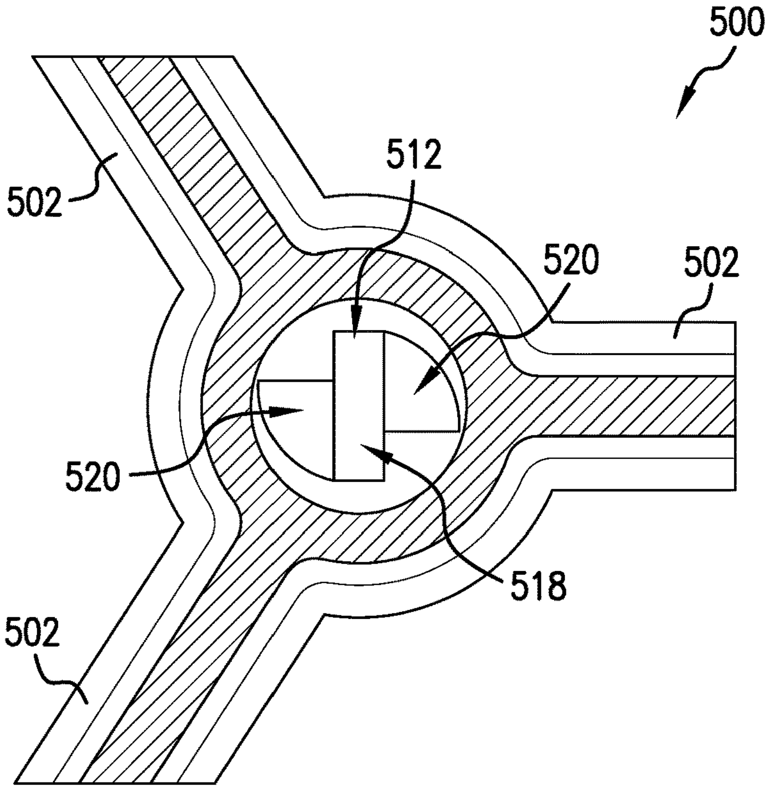
FIG. 5C is a cross-sectional view of the connector post of FIG. 5A as viewed along the line C-C.

Turning now to FIGS. 5A-5C, schematic illustrations of a connector post 500 of a mat (e.g., mats 100, 400 described above) in accordance with an embodiment of the present disclosure are shown. The connector post 500 can be part of an interior structure of a mat (e.g., mats 100, 400). In some embodiments, the connector post 500 may be integrally molded or formed with the structure of the mat (e.g., mat 100, matt 400). The connector post 500 can be integrally formed with the body of the mat 100, 400 or formed from one or more separate components. As shown in FIG. 5A, the connector post 500 defines a connector pin cavity 512 which is an opening or hollow space defined within the connector post 500. The connector pin cavity 512 is sized and shaped to receive a connector pin therethrough and enable locking or fixed connection between the connector pin and the structure or body of the connector post 500.

Where the mat 100, 400 is formed from multiple panels, one or more connector posts 500 can be formed within each panel. For example, FIG. 5A illustrates a first connector post 506 and a second connector post 508 of a mat (e.g., mats 100, 400). The first connector post 506 can be secured to and/or integrally formed with a first panel 502*a* of the mat 100, 400, and the second connector post 508 can be secured to and/or integrally formed with the second panel 502*b* of the mat 100, 400. For example, the first connector post 506 can be welded along the weld line 510 to the second connector post 508. In some embodiments, each of the first connector post 506 and the second connector post 508 include a connector pin cavity that are aligned and formed within the single connector post 500. As such, the connector pin cavity 512 of each respective connector post 506, 508 may be accessed from either side (e.g., top side 514 or bottom side 516) of the mat 100, 400.

FIG. 5B is a top down illustration of the connector post 500 viewing the top side 514 thereof. FIG. 5C is a cross-sectional view looking from the weld line 510 toward the top side 514 as viewed along the line C-C shown in FIG. 5A. As shown in FIG. 5B, the connector pin cavity 512 has a generally rectangular geometry, which may be sized and shaped to receive a connector pin or the like, to enable attachment of a skin or structure to a surface of the mat. As shown in FIG. 5C, the connector pin cavity 512 includes a slot 518 and one or more locking structures 520. The slot 518 has an opening 522 that can be exposed in the top side 514 of the first connector post 506 (or surface of a mat). When the opening 522 is exposed, such as by cutting into material of the first connector post 506, the slot 518 is accessible for insertion of a connector pin. Opposite the opening 522 in the top side 514 of the first connector post 506 along the slot 518 is the one or more locking structures 520. The locking structures 520 are formed proximate the weld line 510 and define an internal structure (positive space or negative space) within the material of the connector post 500. In some embodiments, the locking structure 520 may be an internal open portion of the connector pin cavity 512 proximate the weld line 510 (e.g., a pocket, recess, groove, or the like). The locking structures 520 may be configured to receive a portion of a connector pin to enable secure engagement between the connector pin and material of the connector post 500. In alternative configurations, the locking structures may be positive features that extend from a wall of the slot 518, such as pins, threads, or pedestals, that can be received within a slot/recess of a connector pin.

As shown in FIG. 5C, the connector pin cavity 512 includes two locking structures 520 that are arranged on opposite sides of the slot 518 of the connector pin cavity 512. The locking structures 520 may be rounded in shape, circular in shape, ovoid in shape, curved with increasing radial extent, or other shape/geometry that allows for a rotation of a portion of a connector pin therein. For example, the locking structures 520 may have an arcuate shape that spans at least 45 degrees, such that an extension or portion of a connector pin may be rotated into the locking structure 520. In one such example, the locking structures 520 may span about 90 degrees such that a quarter turn of a connector pin will engage with and lock the connector pin relative to the connector post 500.

Figure 6:
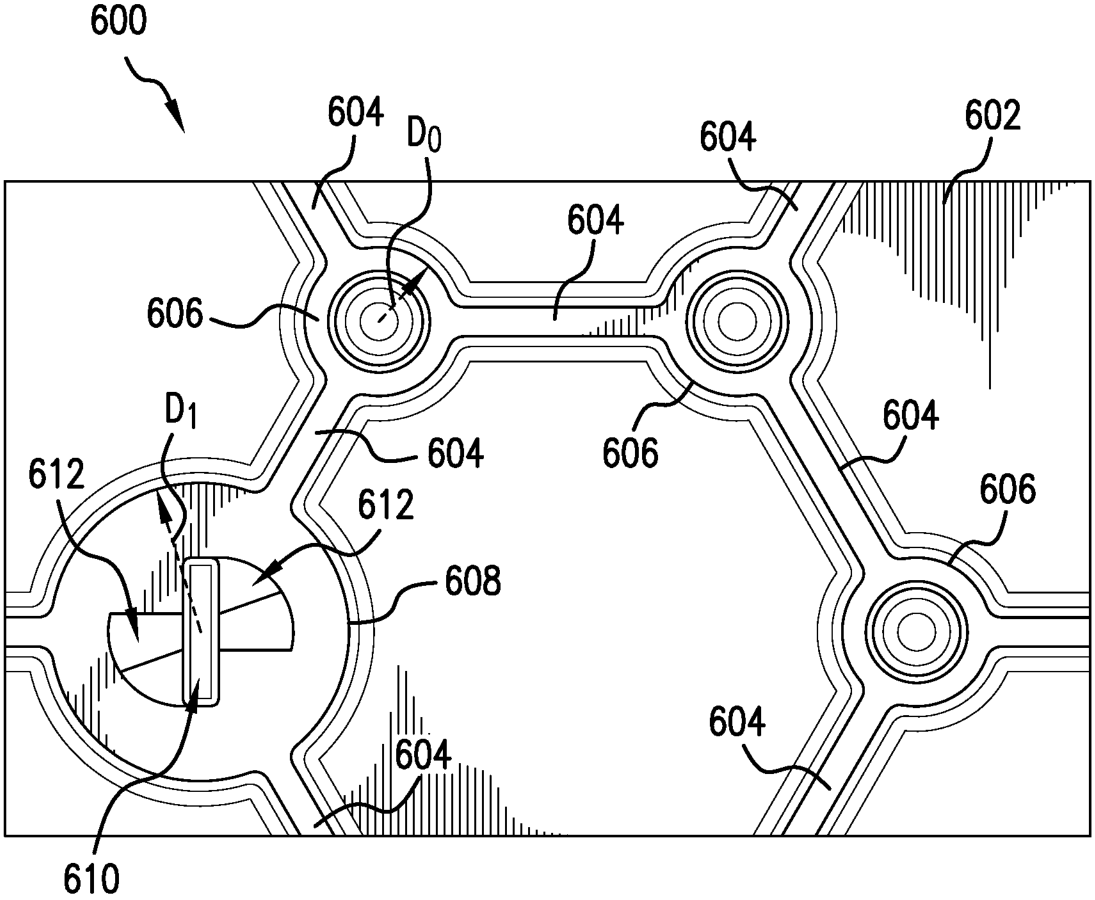
FIG. 6 is a schematic illustration of a portion of an interior support structure of a mat in accordance with an embodiment of the present disclosure

Turning now to FIG. 6, a schematic illustration of an interior structure of a mat 600 in accordance with an embodiment of the present disclosure is shown. The mat 600 includes a top side 602 that may define an exterior or top surface of the mat 600. The view of FIG. 6 is of the under or interior side/surface of the top side 602 of the mat 600. The mat 600 includes an interior support structure that includes internal ribs 604 that join or connect at corner posts 606 and/or connector posts 608. The corner posts 606, the connector posts 608, and the internal ribs 604 extend inward from the top side 602 (e.g., normal from the surface of the top side 602) and extend through a thickness of a panel of the mat 600.

Within the interior support structure of the mat 600, the majority of the internal ribs 604 may join at corner posts 606 and some may join at a connector post 608. The location of the connector posts 608 may be selected based on a predetermined arrangement to enable connector pins to be attached to the mat 600 at predefined locations. As shown, the connector posts 608 are larger in dimension than the corner posts 606, which provides for additional structural integrity to enable engagement with a connector pin. As shown, the corner posts 606 have a diameter $D_0$ and the connector posts 608 have a diameter $D_1$. The increased diameter $D_1$ of the connector posts 608 is provided by additional material of the mat 600 being formed around a connector pin cavity 610 of the connector post 608.

In some non-limiting examples, the diameter $D_1$ of the connector posts 608 may be at least 50% larger than the diameter $D_0$ of the other corner posts 606 that do not include a connector pin cavity 610, as described herein. In some embodiments, the diameter $D_1$ of the connector posts 608 may be 2.5 times greater than the diameter $D_0$ of the other corner posts 606. The increased diameter $D_1$ of the connector post 608 also permits the formation of locking structures 612 of the connector pin cavity 610. The locking structures 612 may be configured to receive an extended portion or end of a connector pin and permit rotation of the connector pin between a locked and secured position and an unlocked position. In the locked position, the connector pin will be securely attached and connected to the mat 600. In the unlocked position, the connector pin may be inserted into and/or removed from the connector pin cavity 610.

Figure 7A:
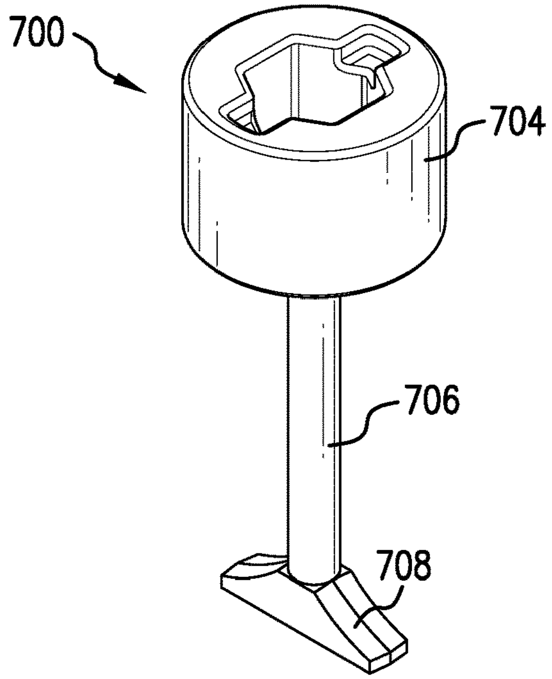
FIG. 7A is a schematic illustration of a connector pin accordance with an embodiment of the present disclosure.
Figure 7B:
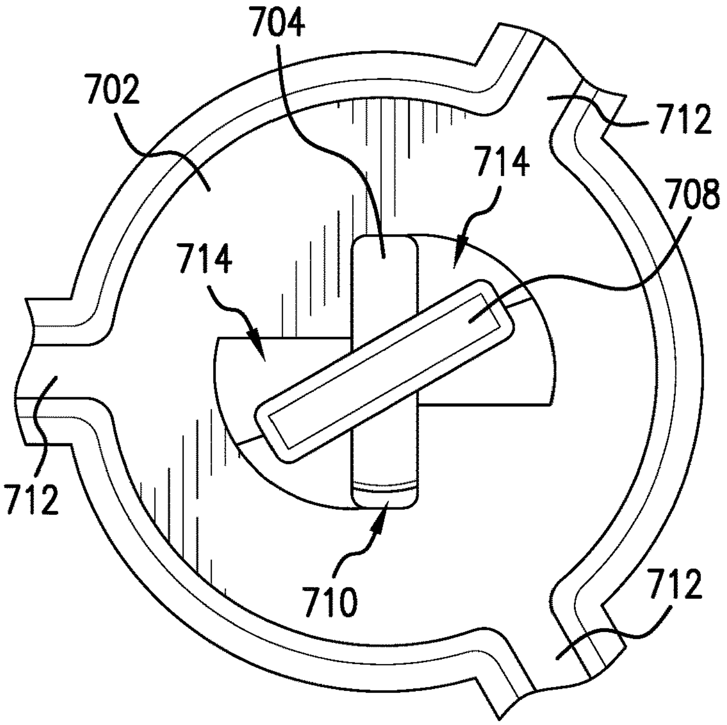
FIG. 7B is a schematic illustration of a connector post having the connector pin of FIG. 7A installed therein.

Turning now to FIGS. 7A-7B, schematic illustrations of a connector pin 700 and engagement with a connector post 702 of a mat in accordance with an embodiment of the present disclosure are shown. The connector pin 700 includes a pin head 704, a pin shaft 706, and a pin foot 708. The pin head 704 may be configured to be engaged by a tool for insertion and engagement of the connector pin 700 within a connector pin cavity 710 of the connector post 702.

As shown in FIG. 7B, the connector post 702 defines a junction or connection of multiple internal ribs 712 of an interior support structure of a mat. The connector post 702 defines the connector pin cavity 710 which includes locking structures 714. During an installation, the connector pin 700 may be inserted into the connector pin cavity 710 such that the pin foot 708 is inserted first and the pin foot 708 and the pin shaft 706 pass through the connector pin cavity 710 such that the pin foot 708 will align with the locking structures 714. The connector pin 700 may then be rotated by use of a tool that engages with the pin head 704 and the pin foot 708 will be rotated into the locking structures 714. As the pin foot 708 is rotated, the pin foot 708 may contact and cause an interference or friction fit with the material of the connector post 702 and securely engage therein. The connector pin 700 may be rotated in an opposite direction to release the engagement and enable removal of the pin shaft 706 and pin foot 708 from the connector pin cavity 710 of the connector post 710.

As shown, the connector pin cavity 710 includes two locking structures 714. Each locking structure 714 is substantially circular in shape and represents about a 90 degree arc to allow rotation of the pin foot 708 therein. The pin foot 708 may be sized and shaped to pass through the connector pin cavity 710 until at least one of the pin head 704 contacts a top surface of the mat or the pin foot 708 reaches a full extent into the mat. When fully inserted into and through the connector pin cavity 710, the pin foot 708 will be free to rotate within the locking structures 714. However, when the pin foot 708 is not aligned with the locking structures 714, the connector pin 700 is prevented from rotation due to the size and shape of the connector pin cavity 710 at locations other than at the locking structures 714.

The connector posts may be distributed or positioned at connector locations (e.g., connector locations 408 shown in FIG. 4) or at any desired location on a mat. Further, as noted, the connector posts may be accessible from both sides/surfaces of a mat (e.g., both top and bottom surfaces). The connector posts described herein may be integrally formed with the respective panels/mats during the manufacturing process of the panels/mats. As such, the structure of the connector posts may be formed of the same material as the rest of the interior support structure of the panels/mats.

Figure 8:
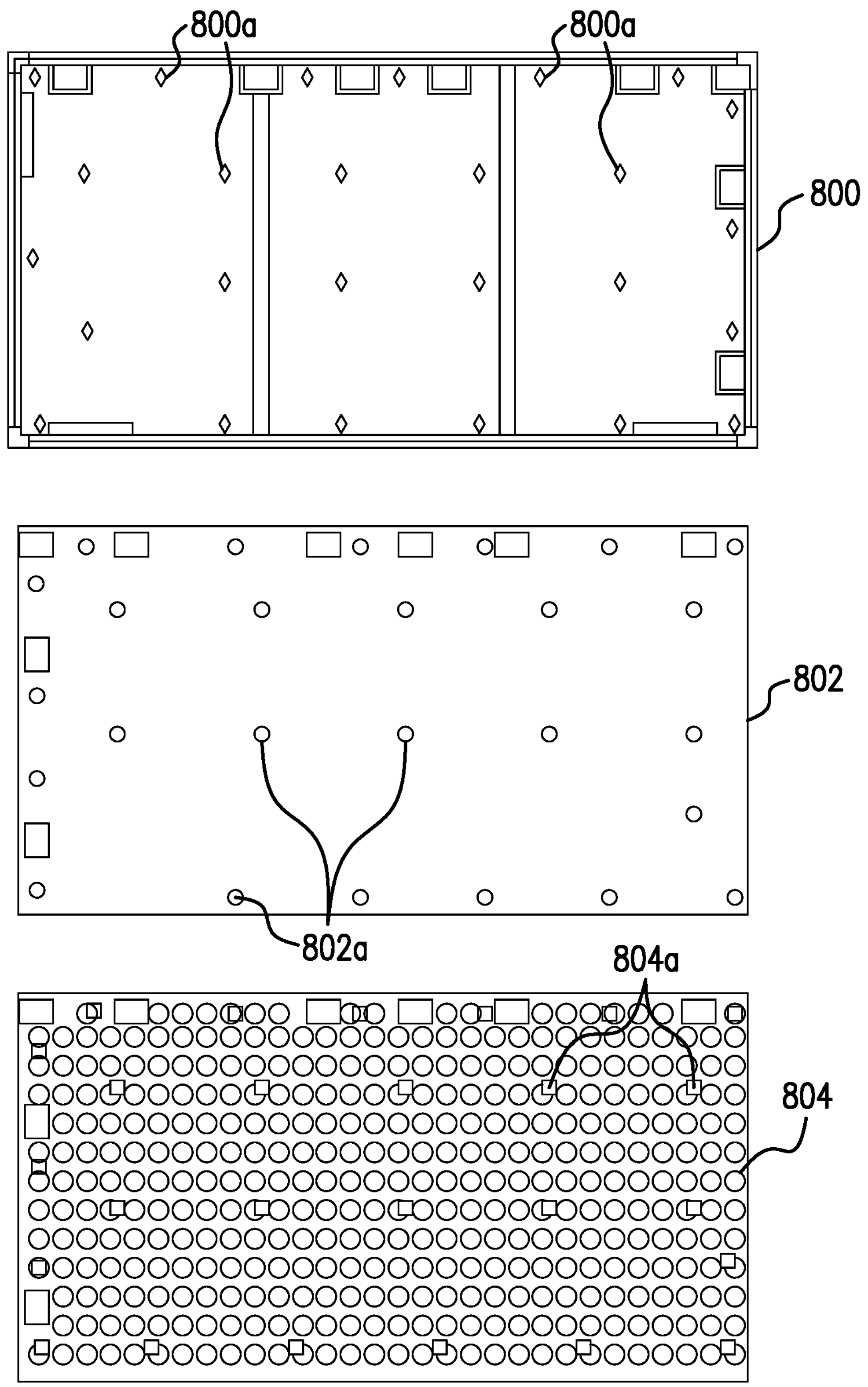
FIG. 8 is a set of illustrations of different skin layers that may be employed with embodiments of the present disclosure.

Turning now to FIG. 8, schematic illustrations of different skins, structures, or other layers to the top surface of mats in accordance with embodiments of the present disclosure are shown. A first skin 800 may be an electrically conductive cover or cage that is mounted or attached to a mat surface by one or more pin connectors. A second skin 802 may be a timber, wood, or other material layer/panel that can be mounted or attached to a mat surface by one or more pin connectors. A third skin 804 may be a metallic or other material layer that can be provided as a high traction skin or surface to be added to a mat. The skins 800, 802, 804 include apertures 800*a*, 802*a*, 804*a*, respectively, that are arranged at locations to align with connector posts of a mat to permit a pin connector to pass through the apertures 800*a*, 802*a*, 804*a* and into a connector pin cavity of a connector post and connect thereto.

Figure 9:
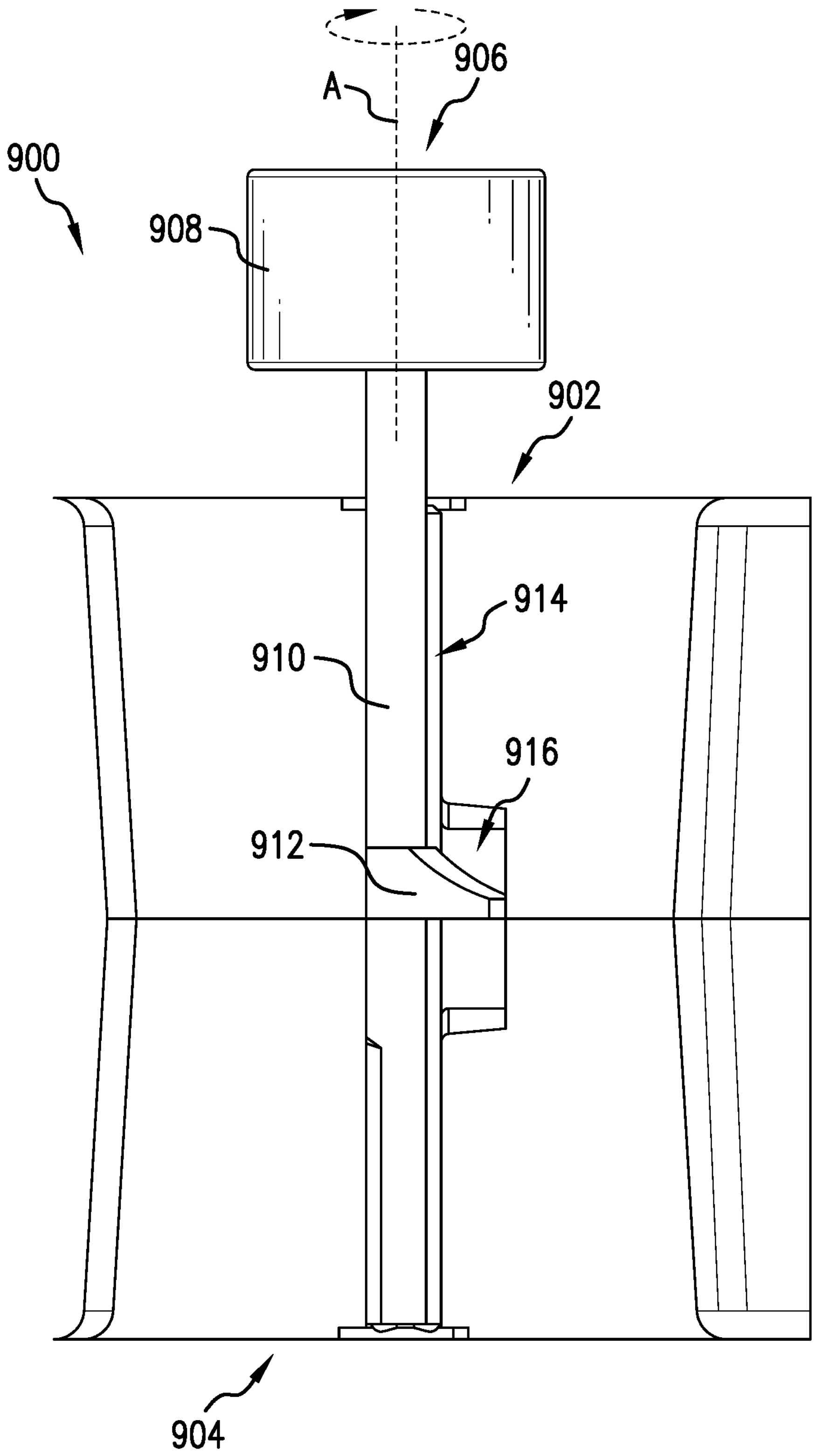
FIG. 9 is a cross-sectional illustration of a connector system for mats in accordance with an embodiment of the present disclosure.

Turning now to FIG. 9, a schematic illustration of a mat 900 in accordance with an embodiment of the present disclosure is shown. The mat 900 includes a first connector post 902 and a second connector post 904 that are aligned with each other along an axis A. A connector pin 906 is shown installed within the first connector post 902. The connector pin 906 includes a pin head 908, a pin shaft 910, and a pin foot 912. As shown, the pin shaft 910 passes through a connector pin cavity 914 and the pin foot 912 is configured to be rotated about the axis A to move between an engaged/locked position and a disengaged/unlocked position.

Figure 10:
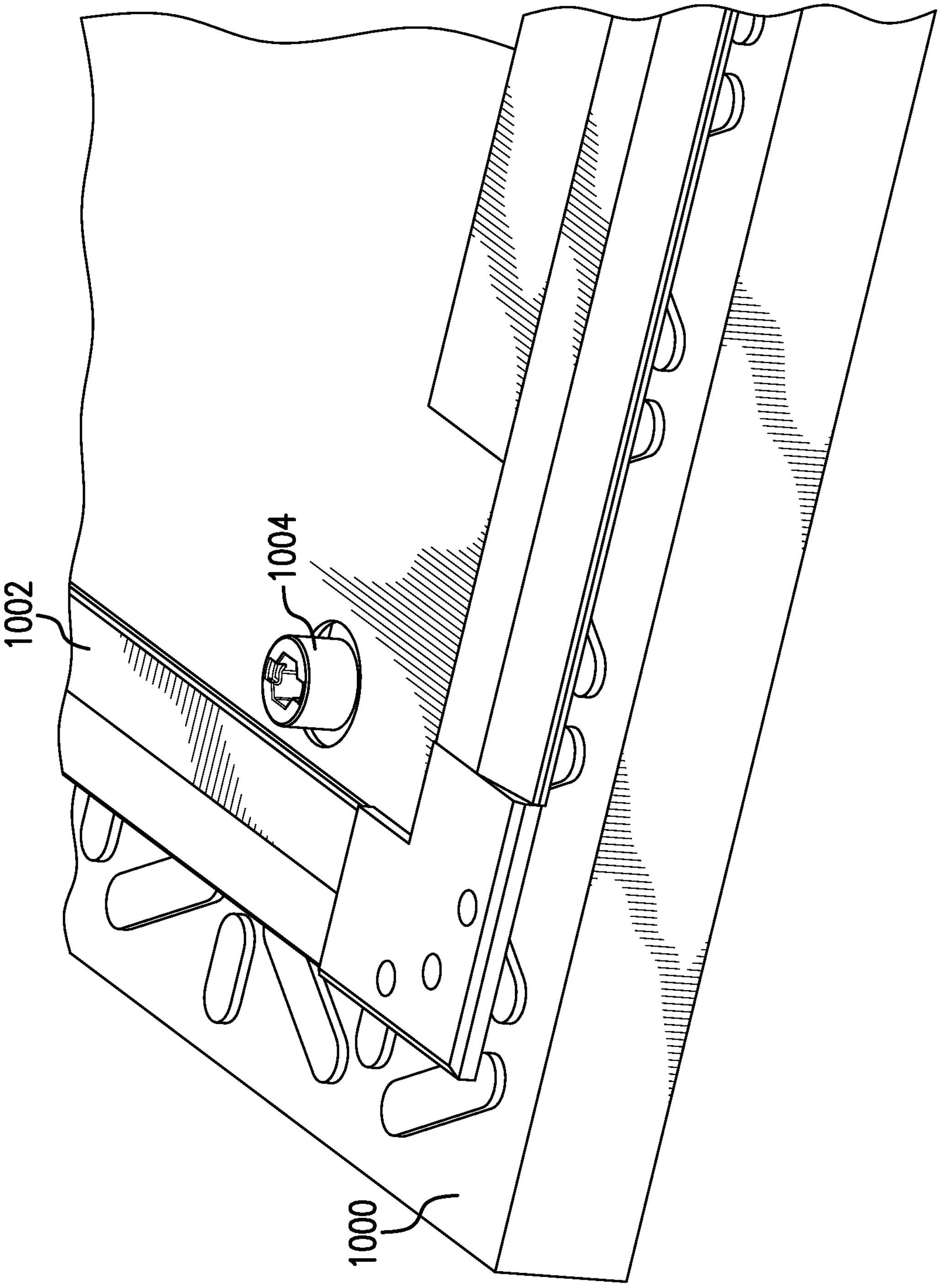
FIG. 10 is a schematic illustration of a mat and skin layer in accordance with an embodiment of the present disclosure.

Turning to FIG. 10, a schematic illustration of a mat 1000 with a skin layer 1002 installed thereon is shown in accordance with an embodiment of the present disclosure. The skin layer 1002 is fixedly attached to the mat 1000 by one or more connector pins 1004. The connector pins 1004 may be similar to that shown and described above or variations thereon. Further, the connector pins 1004 are installed at locations about the mat 1000 where respective connector posts are located. Such locations may be indicated by a surface marker or indicator (e.g., color indicator, texture indicator, or the like). In some embodiments, and without limitation, the skin layer 1002 may be an electrically conductive cover or cage, a high traction skin, and/or a timber panel, for example.

Advantageously, embodiments of the present disclosure are directed to panels and mats that include internal structures that are configured to receive connector pins to enable attachment of skins, structures, or other layers to an exterior surface of a panel and/or mat. Such integrated connector posts remove the need for specialized tools or components to connect such skins/layers. For example, the use of additional connector components may be eliminated, and only a connector pin is required to attach a structure to a surface of the panel/mat.

As used herein, the terms "about" and "substantially" are intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an illustrative embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. An apparatus comprising:

a mat having a top side, a bottom side, and an interior defined between the top side and the bottom side;

a skin layer configured to be secured to one of the top side and the bottom side of the mat by a connector pin; and a connector post extending within the interior of the mat, wherein the connector post comprises:

a connector pin cavity having a first end adjacent to an external surface of one of the top side and the bottom side and terminating at a second end located between the top side and the bottom side within the interior of the mat and configured to receive the connector pin, and a locking structure forming an internal open portion at the second end of the connector pin cavity, the locking structure configured to engage with an end portion of the connector pin and secure the connector pin to the connector post to thereby secure the skin layer to the mat.

2. The apparatus of claim 1, wherein the connector pin cavity comprises a rectangular slot.

3. The apparatus of claim 1, wherein the locking structure of the connector post comprises two pockets arranged at opposite sides of the slot within the interior of the mat.

4. The apparatus of claim 1, wherein the connector post comprises a first connector post of the top side and a second connector post of the bottom side, wherein the first connector post and the second connector post are aligned within the interior of the mat.

5. The apparatus of claim 4, wherein the first connector post and the second connector post are welded together.

6. The apparatus of claim 1, wherein the top side has a top surface that is configured to be cut to expose the connector pin cavity.

7. The apparatus of claim 1, wherein the skin layer is an electrically conductive cover or cage.

8. The apparatus of claim 1, wherein the skin layer is a high traction skin.

9. The apparatus of claim 1, wherein the skin layer is a timber panel.

10. The apparatus of claim 1, further comprising the connector pin installed into the connector pin cavity.

11. The apparatus of claim 10, wherein the connector pin comprises a pin foot configured to engage with the locking structure.

12. The apparatus of claim 11, wherein the connector pin is rotatable within the connector pin cavity to move the pin foot from an engaged and locked position with the locking structure to a disengaged and unlocked position from the locking structure.

13. The apparatus of claim 1, wherein the connector post is integrally molded within the mat.

14. The apparatus of claim 1, wherein the mat includes a surface marker configured to identify a location of the connector post.

15. A method comprising:

providing a mat having a top side, a bottom side, an interior defined between the top side and the bottom side and a connector post within the interior of the mat, wherein the connector post includes a connector pin cavity having a first end adjacent an external surface of one of the top side and the bottom side and terminated at a second end located within the interior of the mat and a locking structure forming an internal open portion at the second end of the connector pin cavity;

positioning a skin layer on the external surface of the one of the top side and the bottom side of the mat;

installing a connector pin through an aperture of the skin layer and into the connector pin cavity; and engaging an end portion of the connector pin to the locking structure to secure the connector pin to the connector post and thereby secure the skin layer to the mat.

16. The method of claim 15, wherein installing the connector pin comprises turning the connector pin a quarter turn to secure the portion of the connector pin to the mat with the locking structure of the connector post.

17. The method of claim 15, further comprising securing the skin layer to the mat with a plurality of additional connector pins at a plurality of respective connector posts of the mat.

18. The method of claim 15, further comprising cutting a surface of the mat to expose the connector pin cavity.

19. The method of claim 18, wherein the cutting is performed at a surface marker on the mat.

* * * * *